United States Patent
Pandit et al.

(10) Patent No.: US 7,624,373 B2
(45) Date of Patent: Nov. 24, 2009

(54) SECURITY MECHANISM FOR INTERPRETING SCRIPTS IN AN INTERPRETIVE ENVIRONMENT

(75) Inventors: Bhalchandra S. Pandit, Redmond, WA (US); Bruce G. Payette, Bellevue, WA (US); James W. Truher, III, Bellevue, WA (US); Jeffrey P. Snover, Woodinville, WA (US)

(73) Assignee: Microsoft Corporation, Redmond, CA (US)

( * ) Notice: Subject to any disclaimer, the term of this patent is extended or adjusted under 35 U.S.C. 154(b) by 733 days.

(21) Appl. No.: 11/096,623

(22) Filed: Mar. 31, 2005

(65) Prior Publication Data

US 2006/0225036 A1    Oct. 5, 2006

(51) Int. Cl.
*G06F 9/44* (2006.01)
*G06F 9/45* (2006.01)
*G06F 11/00* (2006.01)
*G06F 7/04* (2006.01)

(52) U.S. Cl. .................... 717/115; 717/114; 717/136; 726/22; 726/23; 726/26

(58) Field of Classification Search .......... 717/115, 717/114, 136; 726/22, 23, 26
See application file for complete search history.

(56) References Cited

U.S. PATENT DOCUMENTS

| | | | |
|---|---|---|---|
| 5,404,528 A * | 4/1995 | Mahajan | 719/320 |
| 6,078,743 A * | 6/2000 | Apte et al. | 717/115 |
| 6,292,936 B1 * | 9/2001 | Wang | 717/115 |
| 6,651,241 B1 * | 11/2003 | Hernandez, III | 717/115 |
| 6,718,371 B1 | 4/2004 | Lowry et al. | |
| 6,785,685 B2 | 8/2004 | Soetarman et al. | |
| 6,823,504 B1 * | 11/2004 | Sokolov | 717/136 |
| 6,848,101 B2 * | 1/2005 | Maekawa et al. | 717/178 |
| 6,880,125 B2 | 4/2005 | Fry | |
| 6,950,866 B1 | 9/2005 | Lowry et al. | |
| 7,284,274 B1 | 10/2007 | Walls et al. | |
| 2002/0073330 A1 | 6/2002 | Chandnani et al. | |
| 2003/0200349 A1 | 10/2003 | Hansen | |
| 2004/0068715 A1 | 4/2004 | Wong et al. | |
| 2004/0153967 A1 | 8/2004 | Bender et al. | |
| 2004/0210828 A1 | 10/2004 | Langer | |

(Continued)

OTHER PUBLICATIONS

Kc, et al. "Countering Code-Injection Attacks With Instruction-Set Randomization", 2003, ACM, p. 272-280.*

(Continued)

*Primary Examiner*—Qamrun Nahar
(74) *Attorney, Agent, or Firm*—Lee & Hayes, PLLC (57) ABSTRACT

The techniques and mechanisms described herein are directed to a scripting security mechanism that minimizes security risks associated with interpreting a script written with a scripting language. An interpreter recognizes the scripting-language syntax within the script and processes each line that is designated within a data block using a restrictive set of operations. The restrictive set of operations are a subset of the total operations available for processing. If one of the lines within the data block attempts to perform an operation that is not within the restrictive set of operations, the interpreter provides an indication, such as an exception or message explaining the illegal operation. The interpreter also recognizes a list of export variables associated with the data block and exports only the variables identified in the list to an external environment if the export variable meets a constraint identified for it, if any.

14 Claims, 6 Drawing Sheets

U.S. PATENT DOCUMENTS

2005/0071369 A1   3/2005   Lang et al.
2005/0108518 A1   5/2005   Pandya

OTHER PUBLICATIONS

Jaeger, et al. "Support for the File System Security Requirements of Computational E-Mail Systems", 1994, ACM, p. 1-9.*

Linthicum, D.S. "Java Development Environments Evolve", Object Magazine, vol. 8, No. 4, pp. 45-46, 48-49, Jun. 1998.

Brun et al., "ROOT-An Object Oriented Data Analysis Framework", Nuclear Instruments & Methods in Physics Research, Section A, vol. 389, No. 1-2, pp. 81-86, Apr. 1997.

Dominic Olivastro, "Modifying DCL Commands in VAX/VMS: The Command Definition Utility", The VAX Professional, vol. 8, pp. 50-53, Apr. 1986.

Sorzano, et al., "Command-Line Interfaces Can Be Efficiently Brought to Graphics: COLIMATE (the COmmand Line Mate)", Software-Practice and Experience, vol. 32, No. 9, pp. 873-887, Mar. 2002.

Andrew Tucker, "Windows CE's CESH Utility", Dr. Dobb's Journal, vol. 25, No. 5, http://www.ddj.com, pp. 74-80, May 2000.

"Command Line Tailors Software to Buying Operations", Purchasing Software News, vol. 127, No. 4, pp. 153-156, Sep. 1999.

"No Time for GUI's", Digital Systems Report, Computer Electronics, Inc., vol. 19, No. 4, pp. 1-4, Winter 1997.

Tom Yager, "Taking Command Of Windows NT", Unix Review, vol.15, No. 11, pp. 31-32, 34, 36, 38, 40, Oct. 1997.

Eric Flower, "Step-Up to MS-DOS 6.2: An Early Look at Microsoft's Latest Upgrade", Computer in Libraries, vol. 14, No. 2, pp. 30-32, Feb. 1994.

Randy Dykhuis, "Beefing Up Dos with 4DOS", Computers in Libraries, vol. 11, No. 4, pp. 35-37, Apr. 1991.

Giles Todd, "Installing MS-DOS Device Drivers from the Command Line", EXE, vol. 4, No. 3, pp. 16-21, Aug. 1989.

"Intro to Unix: Pipes and Filters", Dec. 15, 2001, retrieved from the internet at http://web/archive/org/20011216234529/http://www.december.com/unix/tutor/pipesfilters.html on Jul. 28, 2008, 2 pgs.

Ramey, et al., "Bash Reference Manual", retrieved from <<http://gd.tuwien.ac.at/utils/shells/bashref.pdf>> on Jul. 25, 2008, Nov. 2001, pp. 1-132.

Varian, "Plunging into Pipes", Proceedings SHARE Europe AM91, Oct. 7, 1991, pp. 1087-1110.

* cited by examiner

SECURITY MECHANISM FOR INTERPRETING SCRIPTS IN AN INTERPRETIVE ENVIRONMENT

TECHNICAL FIELD

This document generally relates to interpretive environments, and more particularly, to scripting languages used in interpretive environments.

BACKGROUND

In general, there are two types of code: compiled code and interpreted code. Compiled code has two general categories. The first category compiles source code into object code and then links one or more object codes together to create an executable, which is executed at run-time. The second category compiles the source code into an intermediate language, which under-goes just-in-time compilation at run-time to create native code that is executed. Hereinafter, the executable and the native code are both referred to as executable code.

In order to assure that the executable code does not harm a computer system, the executable code and its associated source code undergo extensive testing and review. While this minimizes the amount of executable code that is harmful, some harmful executable code still exists. Some of the harmful executable code is unforeseen, while other harmful executable code is specifically written to cause harm to computer systems (e.g., viruses, worms, and Trojan Horse attacks). Fortunately, several mechanisms have been developed to further minimize the risk of harmful code. One mechanism is a feature provided by a processor for recognizing pages in memory as executable or non-executable. Because the operating system directly configures the executable code in memory, the operating system may mark certain memory pages as executable and others as non-executable. Then, when an instruction in the executable code attempts to execute code in the memory page marked as non-executable, the processor throws an exception. This prevents stray pointers and malicious code from harming the information in the memory that is marked as non-executable.

Unfortunately, this feature of the processor is not available when processing interpreted code. Interpreted code is processed at run-time via an interpreter. The interpreter is responsible for processing the interpreted code into commands that the processor can execute. Conceptually, the interpreter operates in a serial manner, inputting a string and interpreting the string into a command. The command is associated with a set of executable instructions that perform the command when executed by the processor. Because the operating system does not manage the memory for interpreted code, the operating system is unable to mark pages in memory as non-executable or executable. From the processor's perspective, it is executing the interpreter software module (i.e., the interpreter) that has been loaded into memory and is being managed by the operating system. The interpreter software module is responsible for processing the interpreted code. In other words, the interpreted code is viewed as "data" to the processor. Thus, security problems arise when interpreted code (e.g., a script) contain "data" that is interpreted into harmful commands (e.g., format c:).

While there are various ways in which a harmful command may be "inserted" into an otherwise useful and harmless script, one way is via an input file. For example, a script may input a text file containing several lines. Each line may list a user's name. The script may then specify a command using each user's name. In this example, the harmful command may be "inserted" by editing one of the lines in the script and appending a malicious string (e.g., format c:) after one of the user's names. Because the interpreter "interprets" its input into commands, the interpreter will interpret the malicious string into the "correct", but harmful, command. Then, when the "correct" command is executed, undesirable and/or harmful actions occur.

One way to minimize the security problems associated with scripts is to have the scripts and any data that is input into the script undergo a formal review and testing procedure similar to source code for compiled code. However, this solution is not ideal, and may not even be attainable.

Thus, until now, an adequate solution for minimizing security problems with scripts in an interpretive environment has eluded those skilled in the art.

SUMMARY

The techniques and mechanisms described herein are directed to a scripting security mechanism that minimizes security risks associated with interpreting a script written with a scripting language. The scripting security mechanism includes a scripting-language syntax for designating code and data. The scripting-language syntax includes a data construct for designating data within the script. When the interpreter encounters the data construct within the script, the interpreter interprets information associated with the data construct using a subset of the total operations available to the interpreter. By allowing the information to be interpreted using the subset of operations, the interpreter reduces the likelihood that the information associated with the data construct will cause harm to a computer system. Thus, the entire script becomes more robust and secure.

The scripting-language syntax may include an export option for selecting which variables to export from the data construct. The export option aids in preventing malicious attacks that overwrite existing variables in the operating environment.

The scripting-language syntax may also include a constraint option for specifying a constraint for any of the variables that are exported from the data construct. The constraint options further restrict the output from the data construct.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Briefly, the present mechanism and technique minimizes the security risks associated with interpreting a script written with a scripting language. The scripting security mechanism includes a scripting-language syntax for designating code and data. The scripting-language syntax includes a data construct for designating data within the script. When the interpreter encounters the data construct within the script, the interpreter interprets information associated with the data construct using a subset of the total operations available to the interpreter. By allowing the information to be interpreted using the subset of operations, the interpreter reduces the likelihood that the information associated with the data construct will cause harm to a computer system. Thus, the entire script becomes more robust and secure. These and other advantages will become clear after reading the following detailed description.

Exemplary Computing Environment

Figure 1:
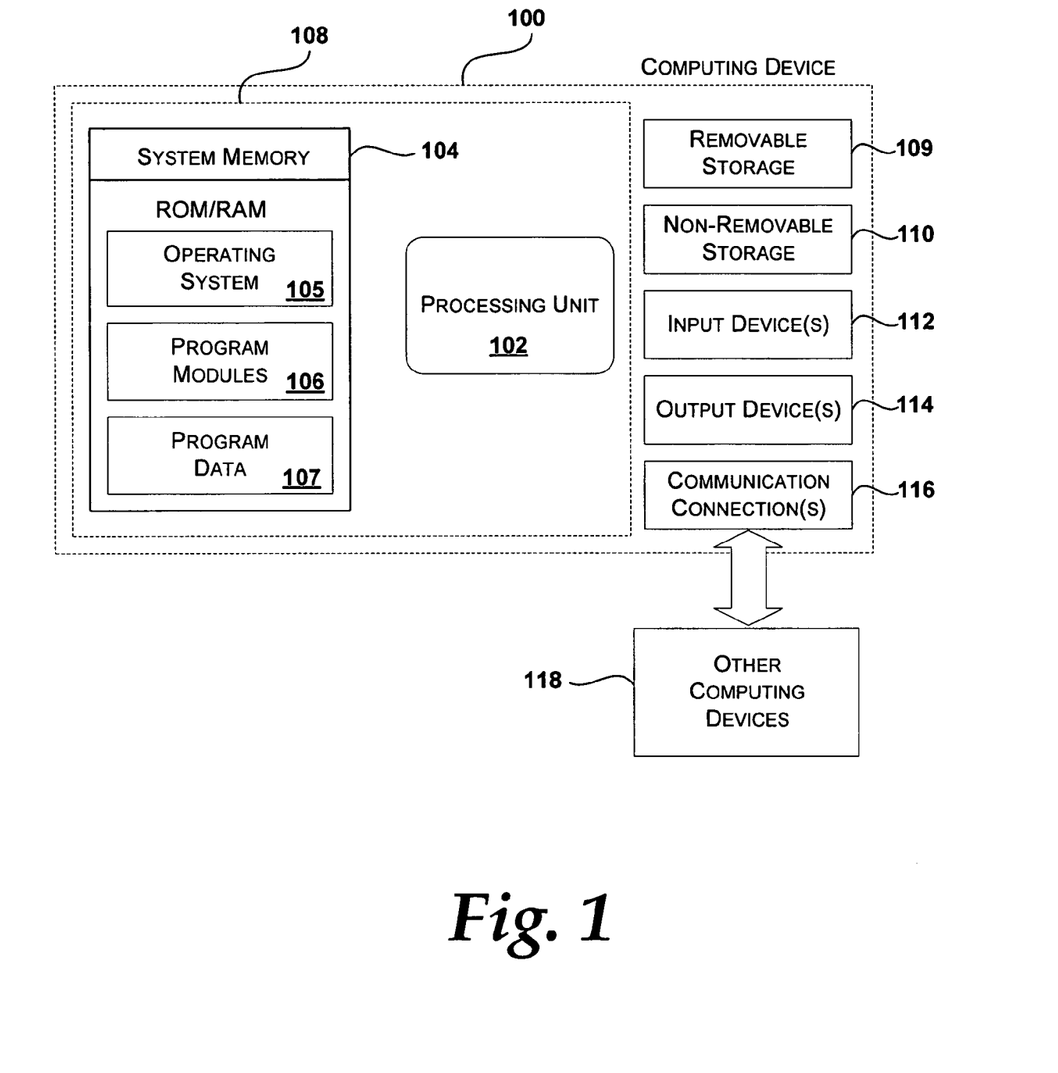
FIG. 1 is an illustrative computer environment that may be used to implement the techniques and mechanisms described herein.

The various embodiments of the present scripting security mechanism may be implemented in different computer environments. The computer environment shown in FIG. 1 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 1, one exemplary system for implementing the scripting security mechanism includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer-readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Figure 2:
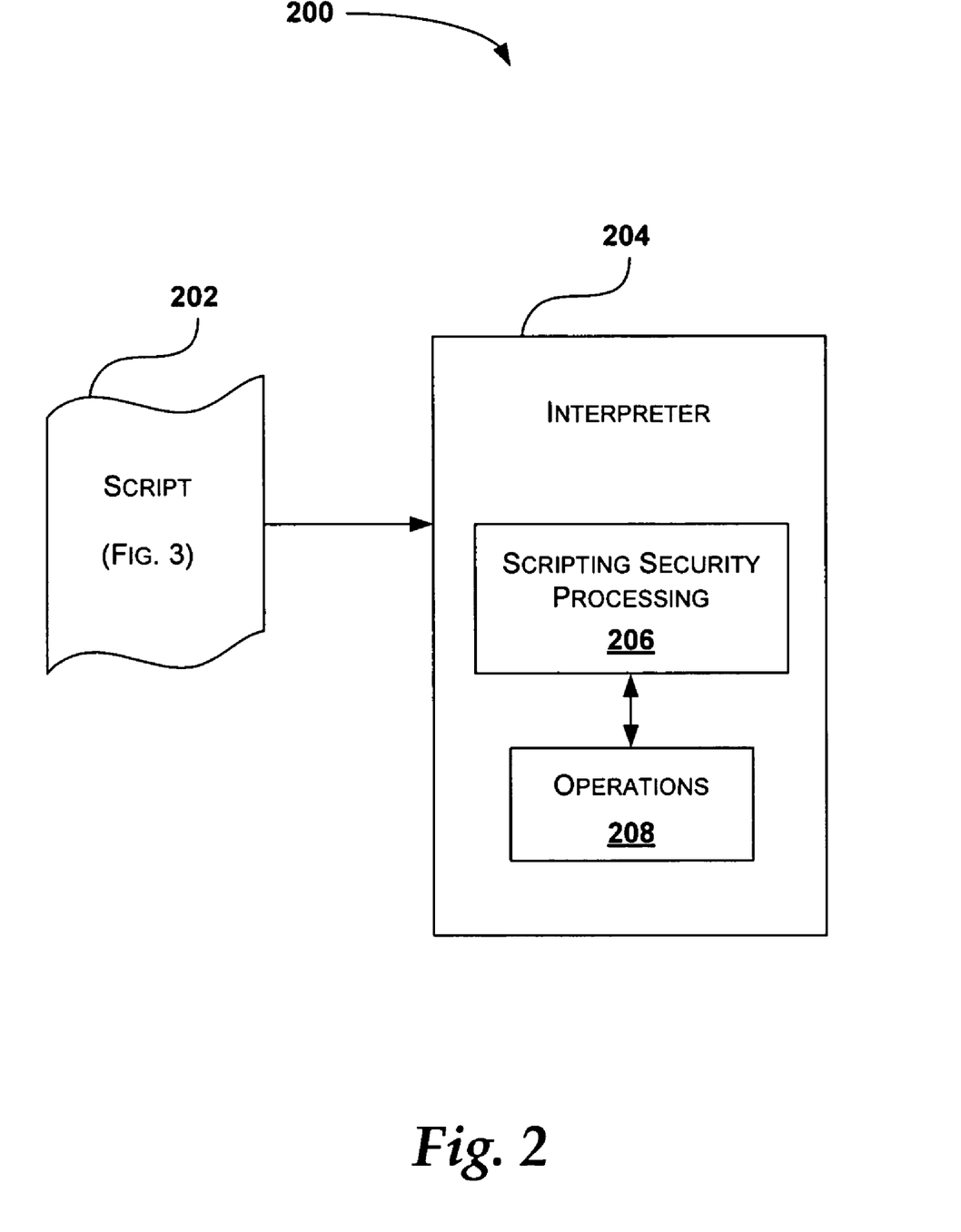
FIG. 2 is a functional block diagram illustrating computer-readable components for implementing the techniques and mechanisms described herein.

FIG. 2 is a functional block diagram illustrating computer-readable components for implementing the techniques and mechanisms described herein. The computer-readable components include a script 202 and an interpreter 204. The script 202 may be written in any of a variety of shell languages. Typically, shell languages are used as "glue" to make tools and programs work together. Because scripts tend to be fairly easy to write, understand, and modify, in comparison with certain programming languages, such as the C programming language, system administrators enjoy using scripting languages for creating scripts that perform administrative tasks. Also, because scripts are "interpreted", rather than compiled into machine code, the scripts provide run-time flexibility. For instance, variables (e.g., variables $A and $T) may contain any sort of text string, such as a data value, a file name, a shell command, or the like. In addition, scripts may generate data "on the fly", which allows the data to change each time the script is run.

Interpreter 204 (also commonly referred to as a script engine) may be one or more software modules implemented within the operating system 105 illustrated in FIG. 2, or as one or more program modules 106 illustrated in FIG. 2, or some combination of the two. The interpreter 204 is configured to "interpret" each line in script 202 and perform corresponding operations. In general, the interpreter 204 receives a line (not shown) from the script 202 and processes the line based on operations 208 available to the interpreter. Each operation 208 is associated with a set of executable instructions that perform the operation when executed by the processor. The operations include assigning values to variables, performing logic operations, executing system commands, and the like. For system administration, many of the operations relate to file management, network management, process management, and the like. As mentioned above, security problems arise when the script 202 contains "data" that is interpreted as a harmful command (e.g., format c:). Because the interpreter "interprets" its input into commands, the interpreter interprets the malicious string into the "correct", but harmful, command. Then, when the "correct" command is executed, undesirable and/or harmful actions occur.

However, by implementing the present scripting-security mechanism, the risk of executing harmful commands within script 202 may be significantly reduced. The scripting-security mechanism includes a scripting-security syntax written within script 202. Briefly, the scripting-security syntax, described in detail below in conjunction with FIGS. 3-5, allows executable code and data to be designated as such within the script. The scripting-security mechanism also includes scripting-security processing 206 performed by interpreter 204. Briefly, the scripting-security processing 206, described in detail below in conjunction with the flow diagram illustrated in FIG. 6, recognizes the scripting-security syntax within script 202 and restricts the type of operations performed on the lines designated as data.

Figure 3:
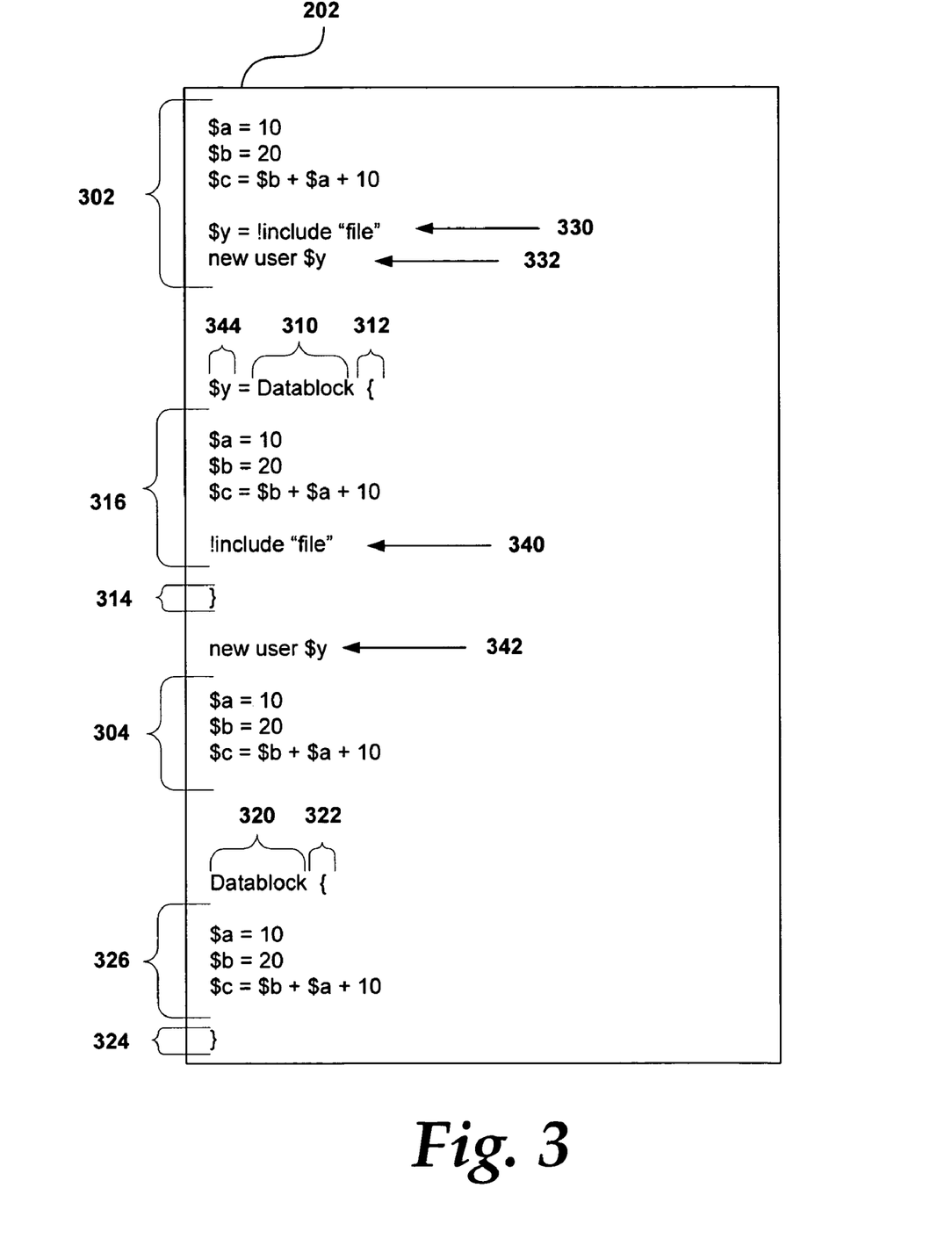
FIG. 3 is a portion of a script illustrated in FIG. 2 that illustrates one embodiment of a scripting-language syntax.

FIG. 3 is a portion of script 202 illustrated in FIG. 2 that illustrates one embodiment of scripting-language syntax for implementing the present scripting-security mechanisms. Script 202 includes several lines of traditional script (represented within parenthesis 302 and 304). As mentioned above, these lines may contain any sort of text string, such as a data value, a file name, a shell command, or the like. These lines 302 and 304 are processed by an interpreter using well known techniques. Interpreter 204 illustrated in FIG. 2 provides processing for lines 302 and 304, as well as processing for the scripting-language syntax described below. Before describing the scripting-language syntax, it should be noted that the lines illustrated within script 202 are used here for example and are intended to help illustrate the general concepts of the present scripting-security mechanism. Thus, the lines, when run, may not be that helpful. However, those skilled in the art of writing scripts will be able to incorporate the scripting-language syntax into more robust scripts with minimal effort.

The scripting-language syntax provides a data construct that includes a data label (e.g., data label 310 and 320). Data labels 310 and 320 illustrated in FIG. 3 use the string "Datablock". However, any combination of text letters or other characters may be used for the data label. For readability of the script, it is beneficial to have the data label use text that describes its purpose. The scripting syntax may also include a start scope indicator (e.g., start scope indicators 312 and 322), such as left parenthesis "{", and an end indicator (e.g., end indicators 314 and 324), such as right parenthesis "}". However, the start scope indicator and the end indicator may be any sequence of characters. Alternatively, the scripting syntax may omit the start scope indicator. In that embodiment, a data block (e.g., data blocks 316 and 326) begins after the data label. In another embodiment, the end indicator may be omitted if the data block is at the end of the script.

Data blocks 316 and 326 include one or more lines of script designated as data. While the lines of script within data blocks 316 and 326 may have the same text as lines within traditional script lines 302 and 304, the interpreter processes the lines within data blocks 316 and 326 using a more restrictive set of operations. The restrictive set of operations is defined within interpreter 204 and act as a default set of operations that are allowed within data blocks. Typically, the default set of operations do not include operations that affect processes, system state, and the like. However, as will be described below, the default set of operations may be modified to allow additional operations within a particular data block. Thus, the present scripting-security mechanism provides flexibility to the script writer, while still providing a higher degree of security than in the past. As shown, there may be one or more data blocks within the script. Each data block may specify their own output and processing requirements. Alternatively, the output and/or processing requirements may be specified at a global level as a policy.

Lines 330, 332, 340, and 342 are now compared with respect to how interpreter 204 processes them. Lines 330, 332, and 342 are within the traditional lines of script 302, while line 340 is within data block 310. Lines 332 and 342 are identical in appearance. However, the processing of each of these lines is remarkably different. If line 342 had been included within the script, an error would have occurred because line 342 may run code of a constructor for a User object which could potentially execute malicious and/or harmful code. While a typical script may not have identical lines, identical lines aid in illustrating the difference in processing between them. As shown, both lines create a new user using information assigned to a variable (e.g., new user $y). For a traditional interpreter, the variable $y is assigned by coping the entire contents of "file" in line 330. In contrast, for the present interpreter that implements the scripting security mechanism, the variable $y is assigned via a return value from a datablock (e.g., Datablock 310), where within the datablock the contents of "file" was included. Continuing with the example described above, assume that one of the lines within the input file at lines 330 and 340 has been appended with a malicious string, such as "format c:". Line 330, processed in the traditional manner, will interpret the malicious string into the "correct", but harmful, command, which gets executed. In contrast, line 340, processed in accordance with the present security-scripting technique, will also interpret the malicious string into the "correct", but harmful, command. However, because this "correct" command is not one of the allowed operations within a data block, the "correct" command will not be executed. In other words, because line 340 is within a datablock, the interpreter will not allow line 342 to receive the potentially harmful command. Thus, anything included from "file" is restricted to be data. The security-scripting technique is described in further detail below in conjunction with FIG. 6.

This security-scripting technique provides several advantages to a script writer. First, the script writer does not need to expend effort on reviewing the input file or adding checks within the script to attempt to catch any harmful code trying to pass off as data. Secondly, the script writer can be assured that the script will not execute harmful code if the harmful code appears within the data block.

Figure 4:
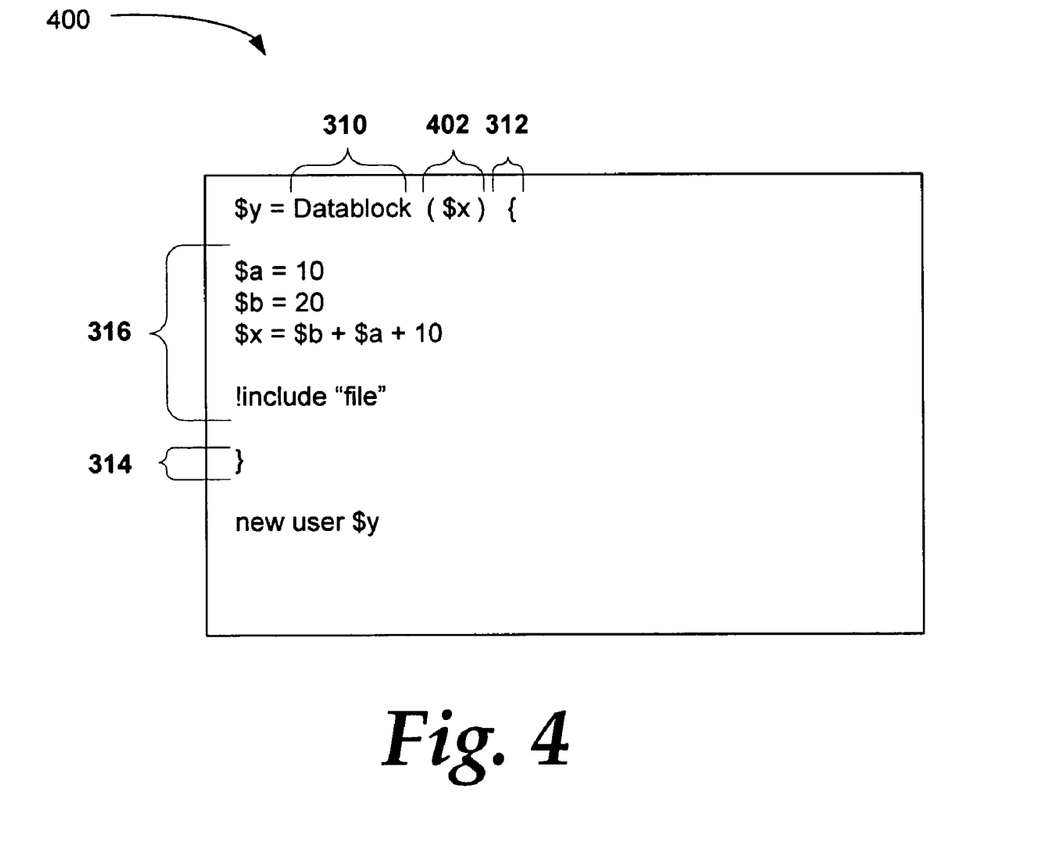
FIG. 4 illustrates another embodiment of a scripting-language syntax that includes an export option.

FIG. 4 illustrates another embodiment 400 of a scripting-language syntax that includes an export option. In this embodiment, an optional export list 402 may be included. The optional export list 402 appears after the data label 310 and before the start scope indicator 312. However, those skilled in the art will appreciate that other arrangements for the export list 402 are possible and these other arrangements are within the scope of the appended claims. The export list 402 identifies one or more variables (e.g., variable $x) that can be "exported" outside the data block. In other words, the export variables identify which external state variables may be modified in the external environment. Thus, not all the variables that are updated within the data block are actually updated in the external environment. By specifying the variables to export from within a data block, the script writer may prevent malicious code from overwriting an existing variable in the environment.

Figure 5:
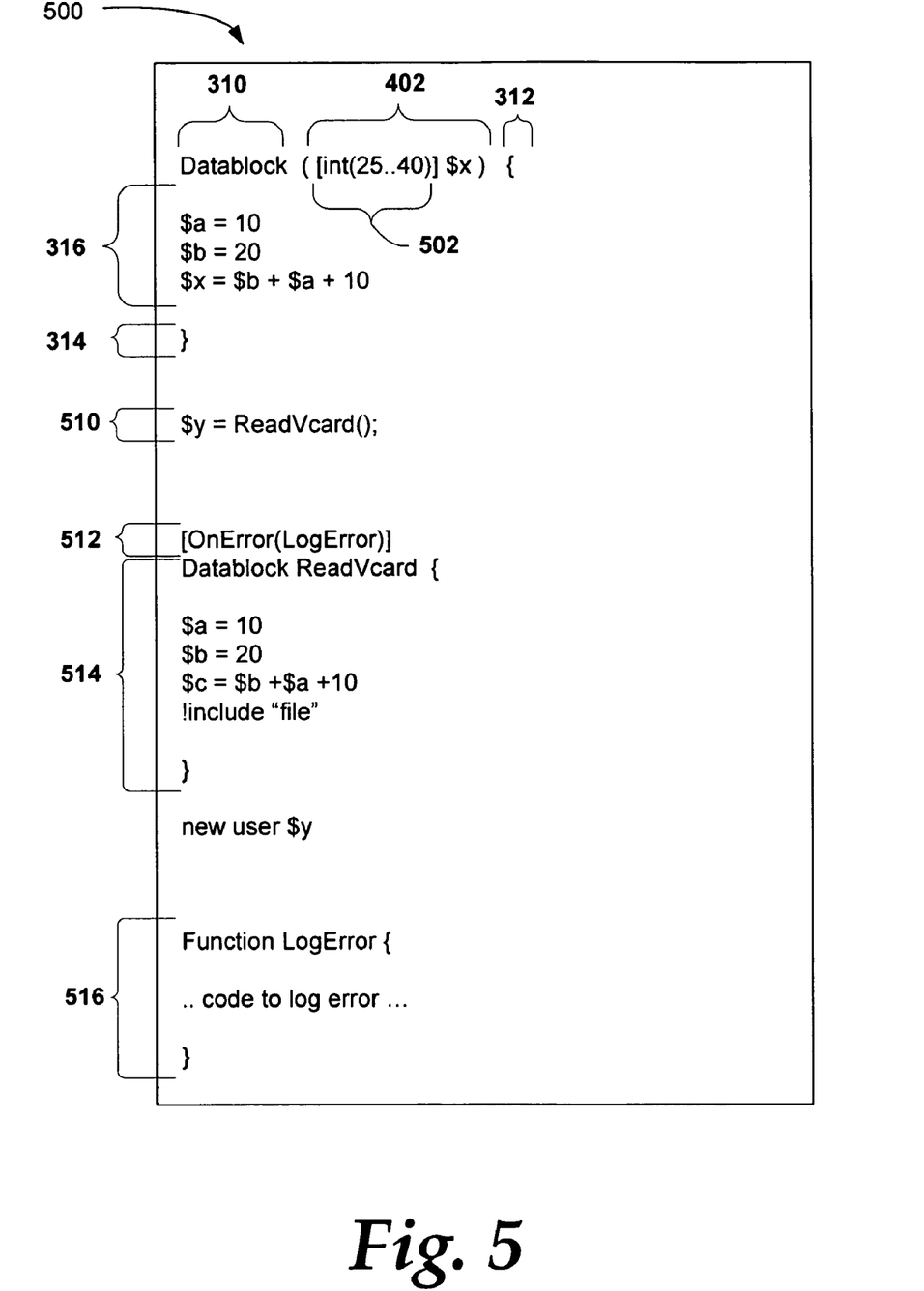
FIG. 5 illustrates yet another embodiment of a scripting language syntax that includes a constraint option.

FIG. 5 illustrates yet another embodiment 500 of a scripting-language syntax that includes a constraint option and an action to take on a constraint violation. In this embodiment, an optional constraint (e.g., constraint 502) may be included. Each of the exported variables identified within the export list 402 may have an associated constraint. In one embodiment, the constraint 502 appears in front of the exported variable name (e.g., $x). The constraint may specify a range that the exported variable should have in order to be exported and/or may specify values or strings that the associated exported variable may export. In addition, the constraint may check whether the variable is within a length range, is within a min/max length, is a member of a fixed list, is regular expression match, and/or the like. The interpreter exports the identified export variables as long as the export variables are within their respective export constraint. If one of the export variables fails the constraint, the interpreter may throw a runtime exception to alert the system administrator of the potential problem. Alternatively, the script writer may specify how the interpreter should handle a specific constraint violation. A metadata attribute 512 may be associated with a datablock (e.g., Datablock 514). The metadata attribute 512 specifies the action (e.g., execute LogError function) to take if an error occurs while running the associated datablock. This allows versatility in handling Datablock errors instead of using a fixed set of actions for all data blocks.

It is envisioned that the use of constraints and/or the specification of actions to take upon a constraint violation may be used in many different scenarios. For example, in one scenario, a system administrator may use it for a confidence check of the script. In this scenario, the number of data elements processed by the script provides a level of confidence to the administrator that the script performed correctly. If the system administrator sees that the script processed a certain number of data elements, the system administrator feels relatively confident that the script performed correctly. However, if unusually large or small numbers of data elements are processed, the system administrator may want to investigate the reason for the unexpected results. Using the present security mechanism, the system administrator may set a constraint on the variable that keeps a tab on the number of data elements that are processed. The constraint may specify a certain range for the variable. During the interpretation of the script, if the interpreter does not obtain a number within the defined constraint, the interpreter may throw an exception, generate an error, request confirmation to proceed or stop, and the like.

In another embodiment, the scripting-language syntax may allow the default set of operations to be modified for a particular data block. The following is an exemplary syntax for modifying the default set of operations:

[OperationsAllowed(Literals, ConstantExpressions)]
    datablock Foo { . . . }

The interpreter will then restrict the data block to only allow literals and constant expressions.

Figure 6:
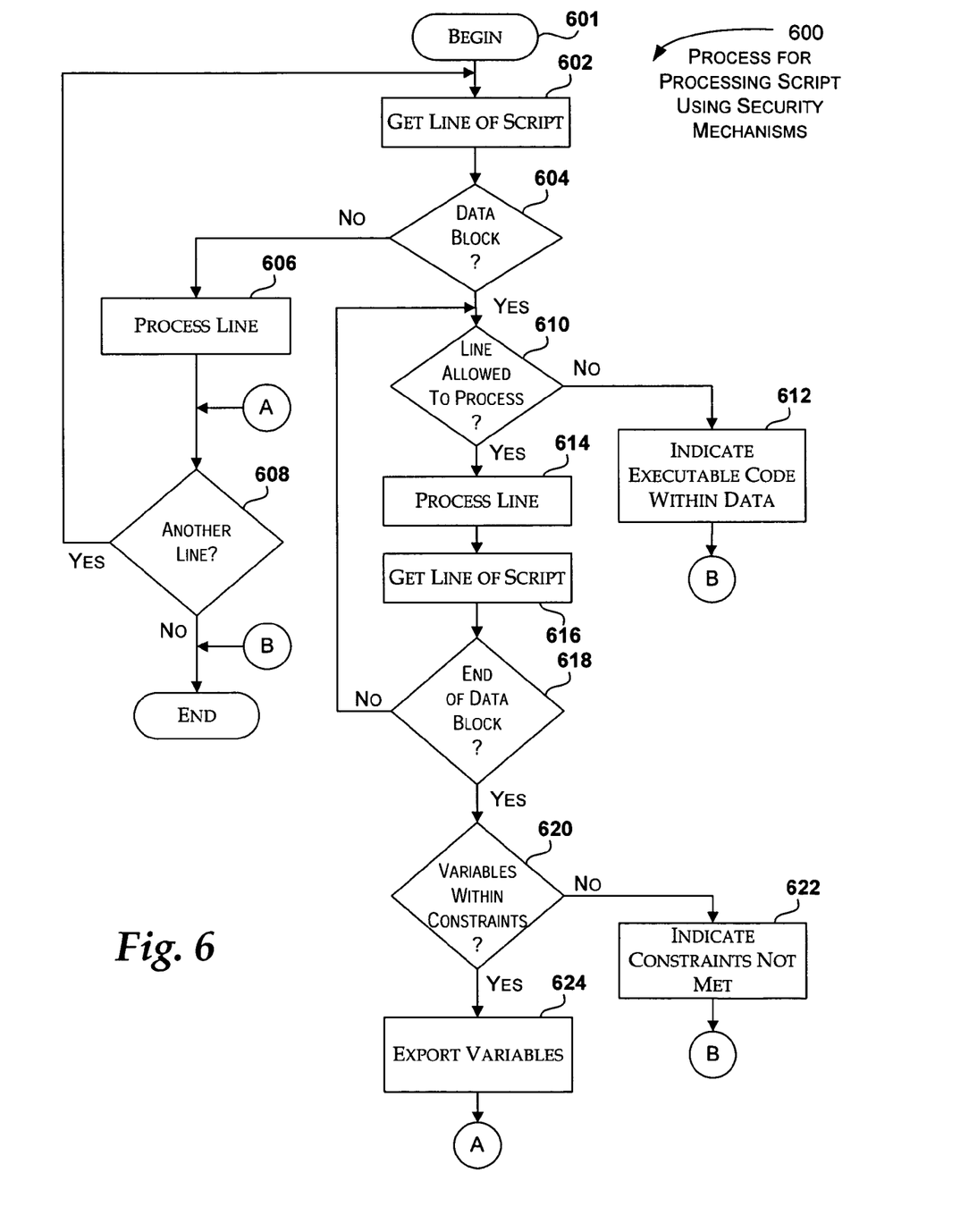
FIG. 6 is a flow diagram illustrating one embodiment of an interpretive process performed by the interpreter component illustrated in FIG. 2.

FIG. 6 is a flow diagram illustrating one embodiment of an interpretive process performed by the interpreter component 204 illustrated in FIG. 2. The process begins at block 601, where a script has been received for processing. Processing continues at block 602.

At block 602, a line from the script is retrieved. Retrieving the line is performed in any well known manner. Processing continues at decision block 604.

At decision block 604, a determination is made whether the line contains the scripting-security syntax in accordance with the present scripting security mechanism. As mentioned earlier, the scripting-security syntax may take several different forms. For example, the syntax may include a label, such as "DataBlock", "Data", and the like. It also may include a start designation and an end designation, such as "{" and "}", respectively. If the line does not contain the label for the scripting-security syntax, processing continues at block 606.

At block 606, the line is processed without the application of security mechanisms. At decision block 608, a determination is made whether there is another line within the script. If there is another line, processing loops back to block 602 to get another line. Otherwise, processing is complete. As one can see from the flow diagram, if the script does not contain the scripting-security syntax, the script is processed as it had been processed in the past. However, if the scripting-security syntax is identified in the line at block 604, processing continues as decision block 610.

At decision block 610, a determination is made whether the line is allowed to process. As mentioned earlier, a subset of the total operations are allowed to be performed on the lines in the data block. The subset may be defined to disallow deletion of files, changing of specific state variables, and the like. This prevents the execution of unexpected executable code. However, some executable code that will not harm the computing system when executed may be included within the subset of operations, such as $A=32. If the line is associated with an operation not defined within the subset of operations, processing continues at block 612.

At block 612, an indication is output. The indication indicates that the line attempted to execute code that was not authorized within the data block. The indication may be an error message, stopping the processing of the script, and/or the like. Alternatively, the indication may be a message that requires input for either proceeding with the script or exiting the script. If the input to the message indicates proceeding with the script, processing continues at block 614. Otherwise, processing is ended for the script.

At block 614, the line is processed. For the line that includes the label this may involve identifying export variables and any constraints associated with the export variables. For other lines that are processed within the data block, the variables that are used during the processing of the line are not immediately exported. Instead, as will be described below in conjunction with block 624, only the variables specified for export are exported. Processing continues at block 616.

At block 616, the next line in the script is retrieved. Each line within the data block is processed using the subset of operations defined. This ensures that malicious executable code will not be executed, and if an attempt is made to execute code that is not allowed, the administrator will be alerted. Processing continues at decision block 618.

At decision block 618, a determination is made whether the next line includes an indication for the end of the data block. In the case that the next line has a command along with the end indication, the process performs block 614 on the command portion and then exits the processing within the data block by proceeding to decision block 620. If the next line does not include the end indication, processing loops back to decision block 610 and proceeds as described above.

At decision block 620, a determination is made whether each of the variables that had constraints defined for it were within the constraints specified. If one or more of the variables did not meet their constraints, processing continues at block 622.

At block 622, an indication that one or more of the variables did not meet their constraints is output. Similar to the indication described in block 612, the indication may be an error message, stopping the processing of the script, and/or the like. Alternatively, the indication may be a message that requires input for either proceeding with the script or exiting the script. If the input to the message indicates proceeding with the script, processing continues at block 624. Otherwise, processing is ended for the script.

At block 624, the variables defined for exporting are exported. For example, system state variables may be updated with new values and the like. Processing then continues at decision block 608 to check if there are more lines to process in the script. Processing then continues as described above.

As one can easily imagine, there may multiple data blocks within one script. Alternatively, the entire script may be written within one data block. By utilizing the present scripting security mechanisms in a script, an administrator responsible for running the script may be provided information alerting him to potential corrupt data, possible security problems within the script, and the like, thus, providing another level of security when running scripts.

The present scripting security mechanism provides many advantages to script writers. The scripting security mechanism is especially important when the script operates on large data sets that do not lend themselves to be conveniently inspected for potentially harmful instructions. By utilizing the present scripting security mechanism, the script writer may be provided some assurance that the script will not execute harmful instructions. Thus, the script writer does not have to inspect the code within the data block.

Using the above teachings, the present scripting security mechanisms may be implemented in different interpretive environments by those skilled in the art. Each of the interpretive environments can then achieve the advantages outlined above. For example, the scripting security mechanism may be implemented within the MONAD shell developed by the Microsoft Corporation of Redmond, Wash.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method for processing a script within an interpretive environment, the method comprising:
   receiving the script comprised of at least one command specifically written to cause harm to computer systems;
   identifying a data block within the script comprised of at least one line;
   determining whether interpretation of the at least one line results in an allowable operation, the allowable operation a subset of a total operations available for processing, wherein determining whether interpretation of the at least one line results in an allowable operation includes determining whether the at least one line modifies an external state variable that is listed in an export list comprised of allowable export variables;
   processing the at least one line when interpretation of the at least one line results in an allowable operation;
   determining whether the modified external state variable complies with an export constraint when the at least one line modifies an external state variable that is listed in the export list; and
   modifying the external state variable when the modified external state variable complies with the export constraint.

2. The computer-implemented method of claim 1, further comprising providing an indication when the at least one line interprets into an operation that is not allowable.

3. The computer-implemented method of claim 1, further comprising requesting an input to either proceed with the script or exit the script when the at least one line interprets into an operation that is not allowable.

4. The computer-implemented method of claim 1, further comprising:
   requesting an input to either proceed with the script or exit the script when the at least one line interprets into an operation that is not allowable; and
   processing the at least one line that interprets into an operation that is not allowable when the received input indicates to proceed with the script.

5. The computer-implemented method of claim 1, wherein identifying the data block comprises recognizing a label designating a start for the data block.

6. The computer-implemented method of claim 1, further comprising identifying a list of variables to export to an external environment when processing of the data block completes.

7. The computer-implemented method of claim 1, wherein the constraint is specific to two or more data blocks.

8. The computer-implemented method of claim 1, further comprising:
   receiving input for either proceeding with the script or exiting the script when the modified external state variable complies with the export constraint.

9. The computer-implemented method of claim 1, wherein the export list specific to the data block.

10. The computer-implemented method of claim 1, further comprising:
    avoiding processing of the at least one line when interpretation of the at least one line assigns an unallowable variable; and
    assigning the variable via a return value from the data block.

11. At least one computer-readable storage medium storing computer-executable instructions for performing a method, the method comprising:
    receiving a line from a script;
    recognizing a start indication within the line that identifies a start of a data block;
    recognizing an end indication within a subsequent line of the script that identifies an end of the data block;
    determining whether interpretation of the line of script between the start indication and the end indication results in an allowable operation, wherein determining whether interpretation of the line of script between the start indication and the end indication results in an allowable operation includes determining whether the line modifies an external state variable that is listed in an export list comprised of allowable export variables;

processing the line of script using a subset of a plurality of operations available;

determining whether the modified external state variable complies with an export constraint when the line modifies an external state variable that is listed in the export list; and modifying the external state variable when the modified external state variable complies with the export constraint.

12. The computer-readable storage medium of claim 11, wherein the subset of operations are pre-determined to be non-harmful operations.

13. The computer-readable storage medium of claim 11, further comprising recognizing, the export list associated with the data block that identifies at least one variable to export to an external environment.

14. The computer-readable storage medium of claim 11, further comprising:

recognizing the constraint for at least one variable; and providing an indication if the constraint for the at least one variable is not met.

* * * * *

UNITED STATES PATENT AND TRADEMARK OFFICE
CERTIFICATE OF CORRECTION

PATENT NO. : 7,624,373 B2  Page 1 of 1
APPLICATION NO. : 11/096623
DATED : November 24, 2009
INVENTOR(S) : Bhalchandra S. Pandit et al.

It is certified that error appears in the above-identified patent and that said Letters Patent is hereby corrected as shown below:

Title page, item (73), under "Assignee" column 1, line 1, delete "CA," and insert -- WA, --, therefor.

In column 12, line 5, in Claim 13, delete "recognizing," and insert -- recognizing --, therefor.

Signed and Sealed this
First Day of February, 2011

David J. Kappos
*Director of the United States Patent and Trademark Office*